United States Patent Office 3,435,175
Patented Mar. 25, 1969

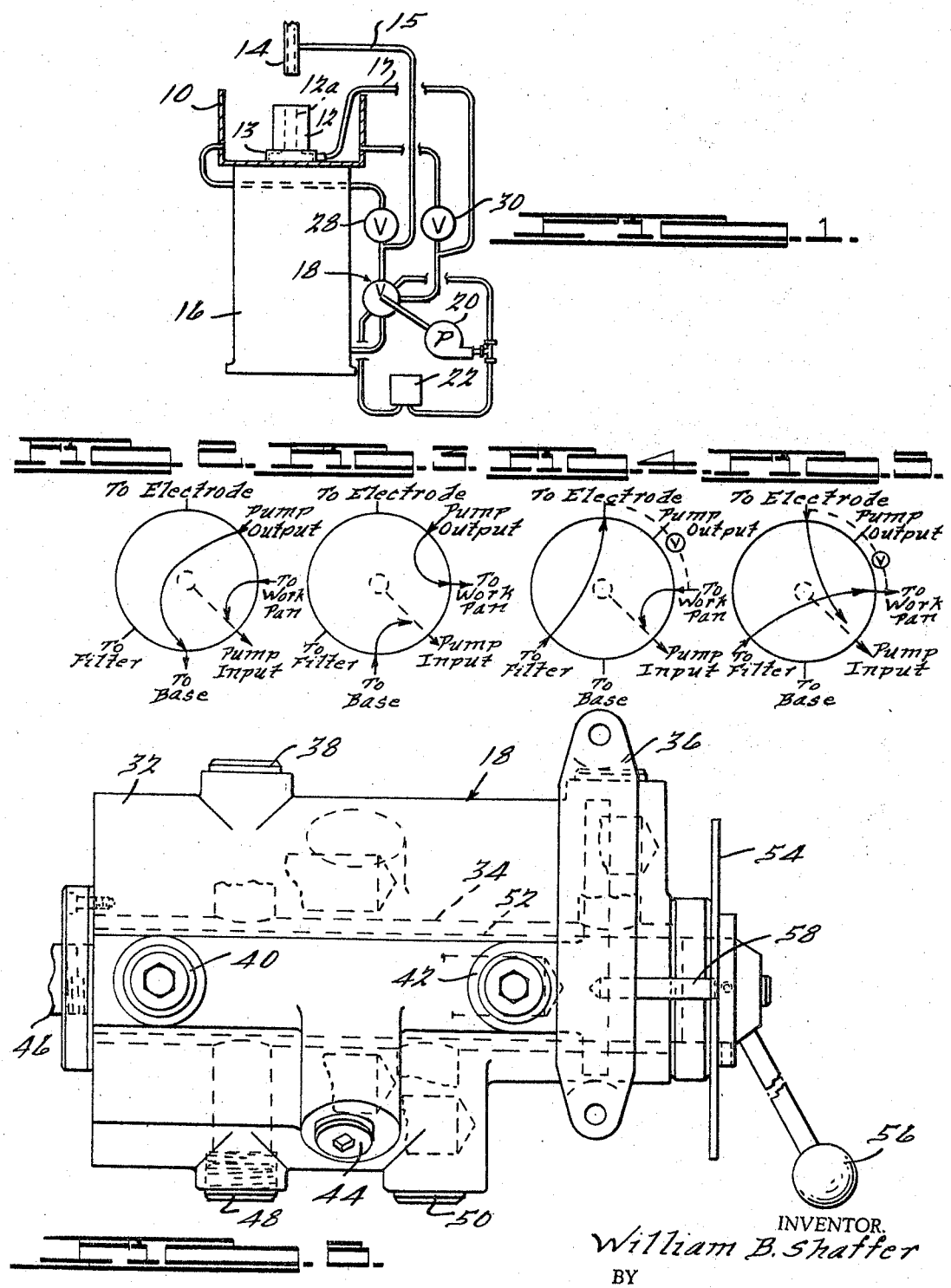

3,435,175
COOLANT CIRCULATION SYSTEM FOR
ELECTRICAL DISCHARGE MACHINING
APPARATUS
William B. Shaffer, Grosse Pointe Woods, Mich., assignor, by mesne assignments, to Elox Inc., Troy, Mich., a corporation of Delaware
Filed Sept. 16, 1965, Ser. No. 487,841
Int. Cl. B23p 1/02; F16k 11/02; D06f 7/04
U.S. Cl. 219—69                            5 Claims

ABSTRACT OF THE DISCLOSURE

An EDM circulation system including a single pressure pump for providing all necessary flow paths to the machining gap through electrode and workpiece either in a reverse or in a forward flow pattern. A single rotatable valve is included in the system with a valve operator for registering a plurality of ports to control selectively the necessary conduit connections between workpan, reservoir, pump and the gap elements.

In electrical discharge machining, a tool electrode is employed to electrically remove particles of a conductive workpiece by passage of machining pulses from a suitable power supply across a dielectric filled gap. During the electrical discharge machining process, it is essential that a supply of coolant be furnished through the machining gap to remove machined particles from that gap to prevent short circuit as may occur by bridging of the gap by machined particles. Various means are employed to insure this constant coolant flow which may be either by way of furnishing coolant to an electrode having one or more coolant passages under pressure into the gap or by circulating the coolant under suction from the gap through the electrode. Prior art coolant circulation systems require a plurality of pumps and valve arrangements to accomplish these functions as well as the other necessary functions of drain and fill of the workpan i.e. container for workpiece subsequent to and preparatory for each different machining operation.

It is an object of my invention to provide an improved coolant circulation system for electrical discharge machining in which the necessary variations in pressure and direction of coolant flow are controllable by a single pump or pressure source and under the selective control of a single operating means.

The advantages of the present invention will best be appreciated with reference to the accompanying drawings, in which:

FIGURE 1 is a schematic diagram of the coolant circulation system in which the present invention is incorporated;

FIGURES 2, 3, 4 and 5 are schematic diagrams illustrating the operation of the present invention in each of its four operating conditions; and FIGURE 6 is an elevational view of the common operating valve showing its porting arrangement.

With more particular reference to FIGURE 1, the basic electrical discharge machining apparatus includes a workpan 10 in which the workpiece 12 is mounted juxtaposed to an electrode 14. Workpiece 12 is shown mounted in a tank 13. In some through hole operations, it is desirable to provide a hole 12a through the workpiece 12 to permit the provision of coolant flow through the workpiece and tank 13 into or away from the gap. Incorporated in the base is a coolant reservoir 16. Also included is a valve 18 which is utilized in the four operating positions of its operating means to exercise the four primary circulation flow paths as will be explained further in connection with FIGURES 2-5 hereinafter. The system utilizes a pump 20 as the pressure source with a filter 22 connected as shown. Bypass valves 28 and 30 are incorporated in the system and utilized in the provision of pressure and suction flow.

FIGURE 2 schematically illustrates first valve position with the operation of "drain."

FIGURE 3 illustrates the second valve position and the "fill" condition of the system. An overflow pipe of adjustable height may be included in the system to provide selectable fluid level in the workpan.

FIGURE 4 illustrates schematically the circulation system arrangement to provide dielectric fluid under pressure from electrode 14 to the gap in the direction of workpiece 12.

FIGURE 5 illustrates schematically the function of the system to provide withdrawal of the dielectric fluid under suction through electrode 14 from the machining gap.

FIGURE 6 shows the valve 18, the porting arrangement, and the common operating means therefor. Valve body 32 has extending therethrough a cylindrical channel 34. Extending through body 32 and into channel 34 are the required control ports to provide flow paths as indicated in FIGURES 1–5. It will be seen that valve 18 as mounted on the machine base by bracket 36 is displaced approximately 180° as compared to the prior schematic showings made. Upper port 38 is connected by a conduit to reservoir 16 in the base of the machine. Laterally extending ports 40, 42 are connected by conduits to the left and right sides of workpan 10. Port 44 is connected to the output of pump 20 while port 46 is connected to the input of pump 20. Ports 48 and 50 may be selectively connected to electrode 14 or workpiece 12. The outputs of valve 18 are controlled by a cylindrical, ported valve operating means 52 mounted in rotatable sealing engagement with channel 34 of valve body 32. A position indicator plate 54 and selector knob 56 are fixed to the right hand end of sleeve 52 by stud 58. The rotative positioning of sleeve 52 causes registration between its ports and the ports of valve body 32 to provide each of the four flow paths described in FIGS. 2–5.

*Description of operation*

The description of operation will now be made with particular reference to the schematic showings of FIGS. 2, 3, 4 and 5 which correspond to the various flow paths established by valve 18 in the respective first, second, third and fourth positions of its operating means. FIGURE 2 illustrates the drain condition in which a coolant flow path is established between the output of pump 20 and reservoir 16 with a concurrent flow path provided between workpan 10 and the input of pump 20. Coolant is thus drained from workpan 10 to reservoir 16 during this position. FIGURE 3 illustrates the fill condition in which a coolant flow path is established between reservoir 16 and the input of pump 20 with a concurrent flow path provided between the output of pump and workpan 10. Coolant is thus provided under pressure from reservoir 16 to workpan 10. FIGURE 4 illustrates the coolant system condition in which coolant flow is provided under pressure through electrode 14 into the machining gap in the direction of workpiece 12. During this condition, a flow path is provided between the output of pump 20 and electrode 14. Filter 22 may be included in the system to insure the provision of clean dielectric coolant to the gap. A concurrent coolant flow path is established between workpan 10 and the input of pump 20. FIGURE 5 illustrates the condition of the system in which withdrawal of coolant is made through electrode 14 from the machining gap. A coolant flow path is provided between the output of pump 20 and workpan 10. A concurrent flow path is provided between the input of pump 20 and electrode 14. By the removal of conduit 15 from its connection with electrode 14 and the attachment of conduit 17 to tank 13 and workpiece 12, the conditions of pressure and suction through workpiece 12 may be provided as described hereinbefore for the third and fourth valve operating positions.

The system of the present invention is also capable of providing the combined condition of suction through electrode 14 and pressure through the opening 12a of workpiece 12 to provide optimum coolant flow through the machining gap. Otherwise stated, in the third and fourth positions of valve 18, it is possible to provide suction through either gap element concurrently with pressure through the other gap element. This type of combined operation is effected when both conduits 15 and 17 are connected to electrode 14 and workpiece 12, respectively. Bypass valves 28 and 30 are separately controllable during this set up to provide compensation for fluid flow existing in the system.

It will thus be seen from the foregoing drawings and description that I have provided an improved coolant circulation system for electrical discharge machining apparatus in which the required flow paths are all selectively preset by a common operating means.

I claim:

1. A coolant circulation system for machining a conductive workpiece by a tool electrode across a dielectric fluid filled gap including a workpan for holding said workpiece, a coolant reservoir, and a pump having an input and output comprising, a common operating valve for said system wherein the improvement comprises a cylindrical valve body having a plurality of spaced ports, and a selectively positional operating means rotatably mounted therein and having a plurality of spaced ports, each registerable with at least one of said first mentioned ports, said operating means rotatable to a first port registering position to connect a conduit from said pump outlet to said reservoir and to connect a conduit from said workpan to said pump inlet to provide workpan drain, said operating means rotatable to a second port registering position to connect a conduit from said pump output to said workpan and to connect a conduit from said reservoir to said pump input to provide workpan fill, said operating means rotatable to a third port registering position to connect a conduit from said pump outlet to said gap and to connect a conduit from said workpan to said pump inlet to provide fluid flow under pressure to said gap, and said operating means rotatable to a fourth port registering position to connect a conduit from said gap to said pump inlet to remove fluid under suction from said gap and to connect a conduit from said workpan to said pump output.

2. A dielectric coolant circulation system for an electrical discharge machining apparatus including a tubular electrode, a workpan for containing a workpiece, a coolant reservoir, a pump having an input and an output comprising, a common operating valve for said system wherein the improvement comprises a cylindrical valve body having a plurality of spaced ports and a selectively positioned operating means rotatably mounted in said body and having a plurality of spaced ports, each registerable with at least one of said first mentioned ports, said operating means rotatable to a first port registering position to connect a conduit from said pump output to said reservoir and to connect a conduit from said workpan to said pump input to provide workpan drain, said operating means rotatable to a second port registering position to connect a conduit from said pump output to said workpan and to connect a conduit from said reservoir to said pump input to provide workpan fill, said operating means rotatable to a third port registering position to connect a conduit from said pump output to said electrode and to connect a conduit from said workpan to said pump input to provide fluid flow under pressure through said electrode to said gap, and said operating means rotatable to a fourth port registering position to connect a conduit from said electrode to said pump input to provide fluid flow from said gap under suction and to connect a conduit from said workpan to said pump output.

3. A coolant circulation system for machining a conductive workpiece by a tool electrode across a dielectric fluid filled gap including a workpan for holding said workpiece, said workpiece having a through hole in the direction of electrode advance, a pump having an input and an output comprising, a common operating valve for said system wheerin the improvement comprises a cylindrical valve body having a plurality of spaced ports and a selectively positioned operating means rotatably mounted in said body and having a plurality of spaced ports, each registerable with at least one of said first mentioned ports, said operating means rotatable to a first port registering position to connect a conduit from said pump outlet to said reservoir and to connect a conduit from said workpan to said pump inlet to provide workpan drain, said operating means rotatable to a second port registering position to connect a conduit from said pump outlet to said workpan and to connect a conduit from said reservoir to said pump input to provide workpan fill, said operating means rotatable to a third port registering position to connect a conduit from said pump outlet to said workpiece and to connect a conduit from said workpan to said pump inlet to provide fluid flow through said workpiece through said gap, said operating means rotatable to a fourth port registering position to connect a conduit from said workpiece to said pump inlet and to connect a conduit from said workpan to said pump output to provide fluid flow under suction from said workpiece.

4. A dielectric coolant circulation system for an electrical discharge machining apparatus including an electrode having a through hole in the direction of relative advance, a workpan for containing a workpiece having a through hole in the direction of electrode advance, a coolant reservoir, a pump having an input and an output comprising, a common operating valve for said system comprising a cylindrical valve body having a plurality of spaced ports and a selectively positional operating means rotatably mounted in said body and having a plurality of spaced ports, each registerable with at least one of said first mentioned ports, said operating means rotatable to a first port registering position to connect a conduit from said pump output to said reservoir and to connect a conduit from said workpan to said pump input to provide workpan drain, said operating means rotatable to a second port registering position to connect a conduit from said pump output to said workpan and to connect a conduit from said reservoir to said pump input to provide workpan fill, said operating means rotatable to a third port registering position to connect a conduit from said pump output to said electrode and to connect a conduit from said workpan to said pump input to provide fluid flow under pressure through said electrode to said gap, said operating means rotatable to a fourth port registering position to connect a conduit from said electrode to said pump inlet and to connect a conduit from said workpan to said pump output to provide fluid flow through said electrode from said gap, and a further conduit connectible to said through-hole of said workpiece to provide fluid flow therethrough under suction away from said gap in said third position of said operating means and to provide fluid flow therethrough under pressure to said gap in said fourth position of said operating means.

5. A dielectric coolant circulation system for an electrical discharge machining apparatus including an electrode having a through hole in the direction of electrode advance, a workpan for containing a workpiece having a through hole in the direction of electrode advance, a coolant reservoir, a pump having an input and an output comprising, a common operating valve for said system comprising a cylindrical valve body having a plurality of spaced ports, and a selectively positioned valve operating means rotatably mounted in said body and having a plurality of spaced ports, each registerable with at least one of said first mentioned ports, said operating means rotatable to a first port registering position to connect a conduit from said pump output to said reservoir and to connect a conduit from said workpan to said pump input to provide workpan drain, said operating means rotatable to a second port registering position to connect a conduit from said pump output to said workpan and to connect a conduit from said reservoir to said pump input to provide workpan fill, said operating means rotatable to a third port registering position to connect a conduit from said pump outlet to said workpiece and to connect a conduit from said workpan to said pump inlet to provide fluid flow from said workpiece through said gap, said operating means rotatable to a fourth port registering position to connect a conduit from said workpiece to said pump inlet and to connect a conduit from said workpan to said pump output to provide fluid flow under suction from said workpiece, and a further conduit connectible to said electrode to provide fluid flow therethrough away from said gap under suction in said third position of said operating means and to provide fluid flow therethrough under pressure in said fourth position of said operating means.

References Cited

UNITED STATES PATENTS

| | | |
|---|---|---|
| 2,785,279 | 3/1957 | Williams. |
| 2,806,485 | 9/1957 | Collins et al. _____ 137—625.24 |
| 2,818,490 | 12/1957 | Dixon et al. |
| 2,885,529 | 5/1959 | Nelson. |
| 2,924,959 | 2/1960 | Israel. |
| 3,067,358 | 12/1962 | De Maine. |
| 3,128,793 | 4/1964 | Schou _____ 137—625.24 |

RICHARD M. WOOD, *Primary Examiner.*

R. F. STAUBLY, *Assistant Examiner.*

U.S. Cl. X.R.

68—184; 137—625.24